(12) United States Patent
Cherolis et al.

(10) Patent No.: US 7,713,027 B2
(45) Date of Patent: May 11, 2010

(54) TURBINE BLADE WITH SPLIT IMPINGEMENT RIB

(75) Inventors: Anthony P. Cherolis, East Hartford, CT (US); Richard H. Page, Guilford, CT (US)

(73) Assignee: United Technologies Corporation, Hartford, CT (US)

( * ) Notice: Subject to any disclaimer, the term of this patent is extended or adjusted under 35 U.S.C. 154(b) by 904 days.

(21) Appl. No.: 11/511,114

(22) Filed: Aug. 28, 2006

(65) Prior Publication Data

US 2008/0050244 A1 Feb. 28, 2008

(51) Int. Cl.
*F01D 5/18* (2006.01)

(52) U.S. Cl. .................................................... 416/97 R

(58) Field of Classification Search ............... 416/96 R, 416/97 R, 233
See application file for complete search history.

(56) References Cited

U.S. PATENT DOCUMENTS

| | | | | |
|---|---|---|---|---|
| 4,775,296 A | * | 10/1988 | Schwarzmann et al. | ... 416/97 R |
| 5,246,340 A | * | 9/1993 | Winstanley et al. | ........ 416/97 R |
| 5,337,805 A | * | 8/1994 | Green et al. | ................. 164/369 |
| 5,975,851 A | * | 11/1999 | Liang | ........................ 416/97 R |
| 7,175,386 B2 | * | 2/2007 | Cherolis et al. | ............. 415/115 |
| 7,270,515 B2 | * | 9/2007 | Liang | ........................ 416/97 R |
| 7,452,186 B2 | * | 11/2008 | Charbonneau et al. | .... 416/97 R |

\* cited by examiner

*Primary Examiner*—Edward Look
*Assistant Examiner*—Nathaniel Wiehe
(74) *Attorney, Agent, or Firm*—Carlson, Gaskey & Olds

(57) ABSTRACT

A gas turbine engine is provided with an airfoil component that is disclosed as a turbine blade. Internal cooling passages circulate air within the blade. An impingement rib separates a cooling air channel from a pedestal array, and includes crossover holes to meter the flow of air into the pedestal array. A lower end of the impingement rib is split to reduce stress concentrations between the impingement rib and a platform. Further, the pedestals adjacent to the lower end of the impingement rib are formed to be stubs, which do not extend entirely across a width of the blade. The disclosed structure reduces the stress concentration at an area where the impingement rib meets the platform.

20 Claims, 3 Drawing Sheets

TURBINE BLADE WITH SPLIT IMPINGEMENT RIB

BACKGROUND OF THE INVENTION

This application relates to an internally cooled turbine blade for use in a gas turbine engine, wherein an impingement rib which meters flow of air into a pedestal array has a split lower portion.

Gas turbine engines are known, and include a plurality of sections, typically serially connected. A fan section supplies air to a compressor section. The compressor section compresses the air and delivers it to a combustion section. The combustion section combusts the air with a mixed fuel, and passes the products of combustion downstream over turbine rotors. The turbine rotors are driven to rotate, and in turn create power, and rotate the fan and compressor sections.

Typically, the turbine section includes a plurality of rotors each mounting a plurality of blades. The blades are exposed to relatively high temperature from the products of combustion. Thus, it is known to provide cooling air internally within the blades.

Each turbine blade typically includes a root section for being mounted within the rotor, a platform section, and then an airfoil extending outwardly from the platform section. The airfoil is generally hollow and includes cooling channels. Design of the cooling channels takes into account a number of different stresses and challenges on the blade. One type of structure used in the cooling channels is found adjacent what is known as the trailing edge of the airfoil. It is known in the prior art to provide an array of pedestals extending between two spaced walls adjacent the trailing edge. The pedestals serve to disrupt the air flow and also serve as heat sinks to allow the air to remove heat from the airfoil. It is known to provide an impingement rib, or generally a separating wall, separating an open air channel from the pedestals. A plurality of cross-over holes extend through the impingement rib to meter the flow of air into the pedestal array.

One challenge with the prior art turbine blades is that there are high stresses on the impingement rib, in particular at an area adjacent to the platform. This high stress concentration can result from a plurality of loads that are found at the connection of the airfoil to the platform.

SUMMARY OF THE INVENTION

In the disclosed embodiment of this invention, an impingement rib is split near a lower end, and adjacent to the platform. By splitting the impingement rib, a relatively elongate cross-over is formed that allows cooling air to pass between spaced paddles. The impingement rib meters air flow into a trailing edge pedestal array.

The paddles provide a gradual transition from the relatively stiff solid rib to no rib, and allow for a balanced distribution of stress. Further, splitting the rib has only a minor effect on internal flow characteristics, such that the function of the impingement rib of metering flow is still achieved.

In addition, in a disclosed embodiment, several of the pedestals near the airfoil to platform interface are formed to not extend completely between the two walls. Instead, pedestal stubs extend from each of the wall towards the other but are spaced in the center. Again, this reduces local stress concentration.

These and other features of the present invention can be best understood from the following specification and drawings, the following of which is a brief description.

DETAILED DESCRIPTION OF THE PREFERRED EMBODIMENT

Figure 1:
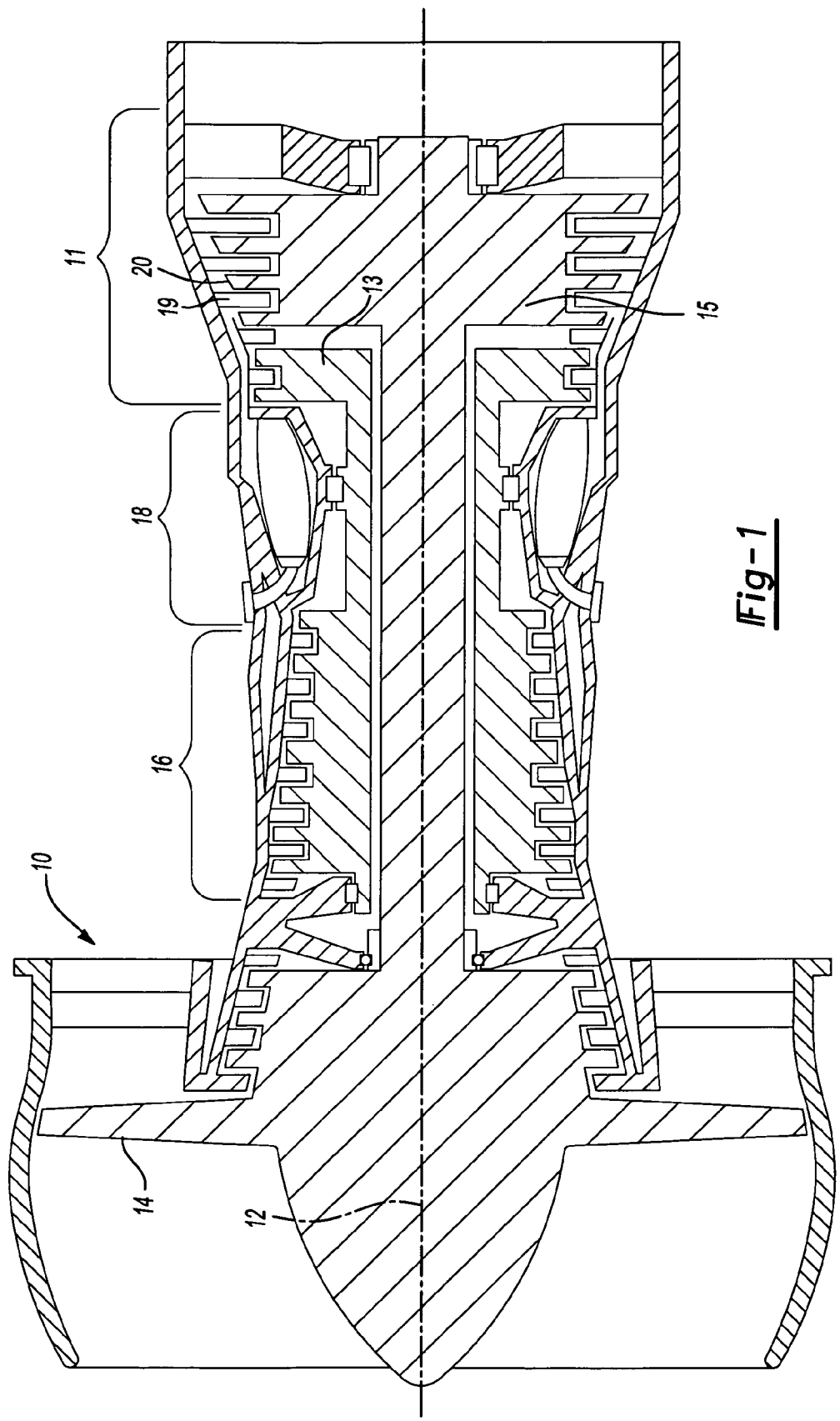
FIG. 1 shows a gas turbine engine.

FIG. 1 shows a gas turbine engine 10, such as a gas turbine used for power generation or propulsion, circumferentially disposed about an engine centerline, or axial centerline axis 12. The engine 10 includes a fan 14, a compressor 16, a combustion section 18 and a turbine 11. As is well known in the art, air compressed in the compressor 16 is mixed with fuel that is burned in the combustion section 18 and expanded in turbine 11. The air compressed in the compressor and the fuel mixture expanded in the turbine 11 can both be referred to as a hot gas stream flow. The turbine 11 includes rotors 13 and 15 that, in response to the expansion, rotate, driving the compressor 16 and fan 14. The turbine 11 comprises alternating rows of rotary blades 20 and static airfoils or vanes 19. FIG. 1 is a somewhat schematic representation, for illustrative purposes only, and is not a limitation on the instant invention that may be employed on gas turbines used for electrical power generation, aircraft, etc.

Figure 2:
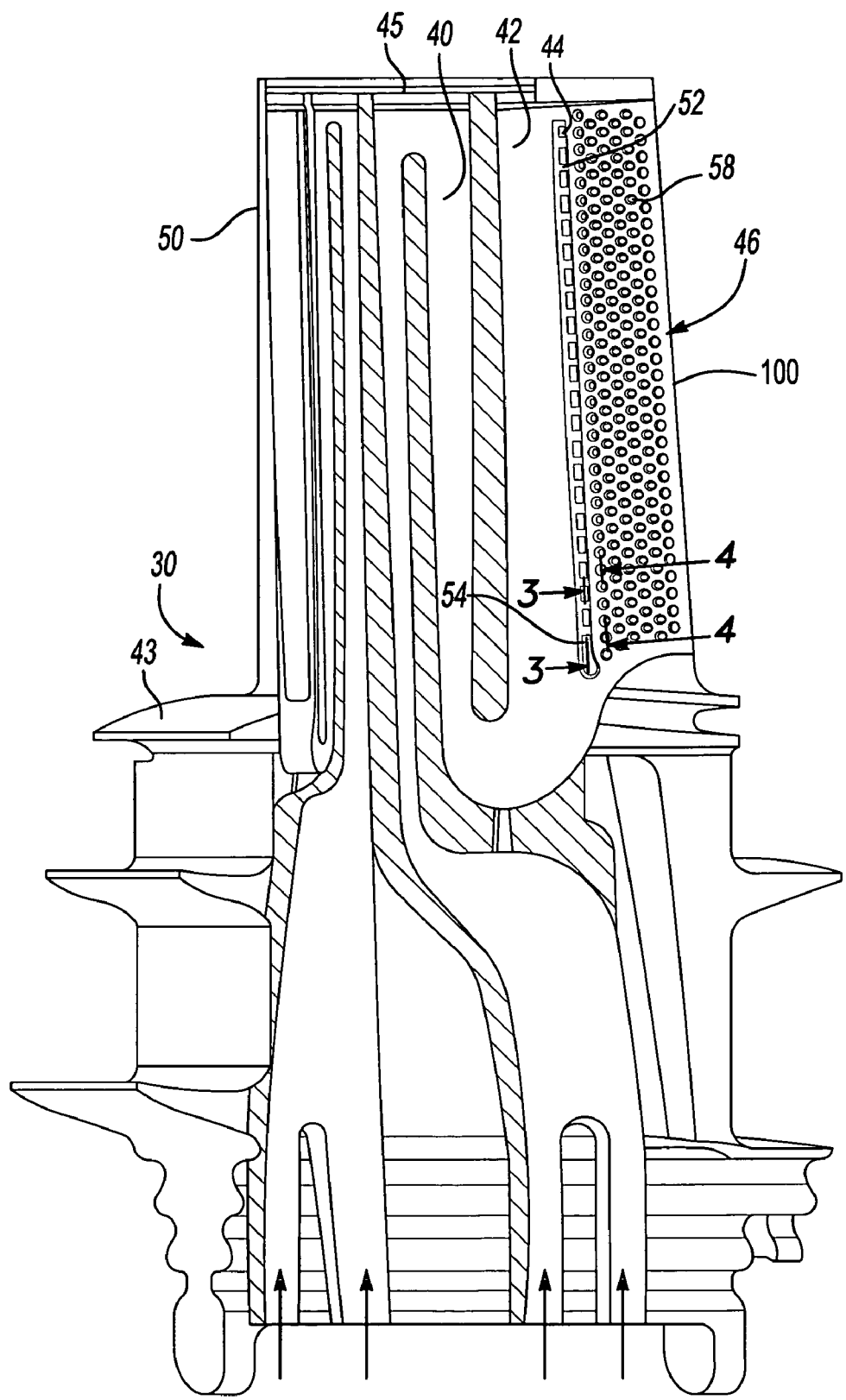
FIG. 2 is a cross-sectional view through a turbine rotor blade according to the present invention.

FIG. 2 shows an inventive turbine blade 30. The blade extends from a leading edge 50 to a trailing edge 100. As known, cooling paths such as a serpentine path 40 and a straight flow-through path 42 are formed in an interior cavity of the blade 30. An impingement rib 44 extends from a top end 45 of the blade downwardly towards the platform 43. As known, air enters the blade from channels below the platform, and flows outwardly toward the top end 45. The impingement rib 44 separates the channel 42 from a pedestal array channel 46 at a trailing edge 100. As known, the pedestal array channel 46 includes a plurality of pedestals 58. The impingement rib 44 includes a plurality of cross-over holes 52 which meter the flow of air from the channel 42 into the channel 46.

Figure 3:
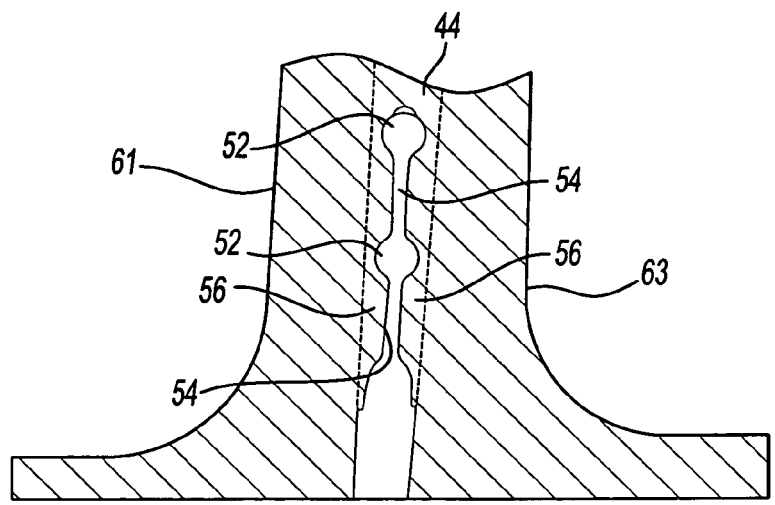
FIG. 3 is a cross-sectional view along line 3-3 as shown in FIG. 2.

As shown at 54, adjacent the platform 43, there is a split in the impingement rib 44. The split 54 can be best seen in FIG. 3. As shown, the split 54 separates two paddles 56 adjacent a lower end of the impingement rib 44. Normal cross-over holes 52 may still be included in the area of the split 54. The split 54 reduces stress concentrations at the lower end of the impingement rib 44.

The impingement rib is cast with the airfoil and suction and discharge walls 61 and 63 as a one-piece item. The separation between the rib and the walls is shown generally by the dashed lines in FIG. 3.

Figure 4:
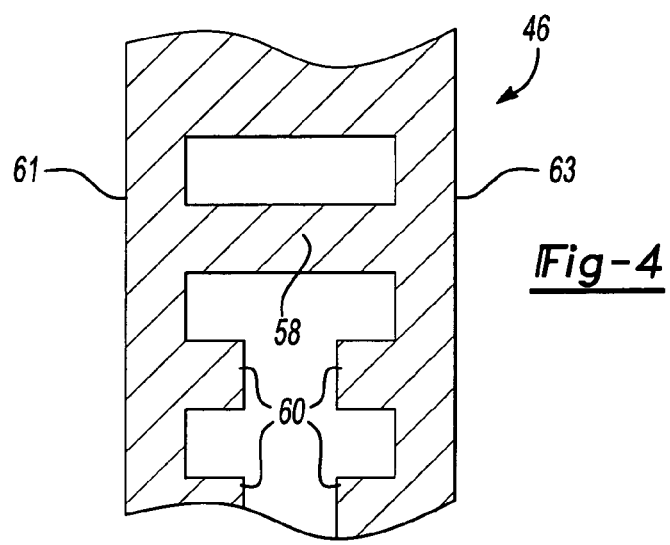
FIG. 4 is a cross-sectional view along line 4-4 as shown in FIG. 2.

Another feature is shown in FIG. 4. Pedestals 58 extend between a convex airfoil wall 61 and a concave airfoil wall 63 of the air flow. However, in the area adjacent the platform 43, and in particular in the area adjacent the impingement rib 44 and the platform 43, pedestal stubs 60 extend from each wall 61 and 63, but do not extend across the entirety of the pedestal chamber 58. Rather, as shown in FIG. 4, they remain spaced.

The purpose of both modifications (i.e., the split 54, and the pedestal stubs 60), is to reduce stress concentrations in this area. The metering of the air will not be highly effected by the inclusion of the split 54. Thus, the goal of properly metering the air into the pedestal array is still achieved.

Figure 5:
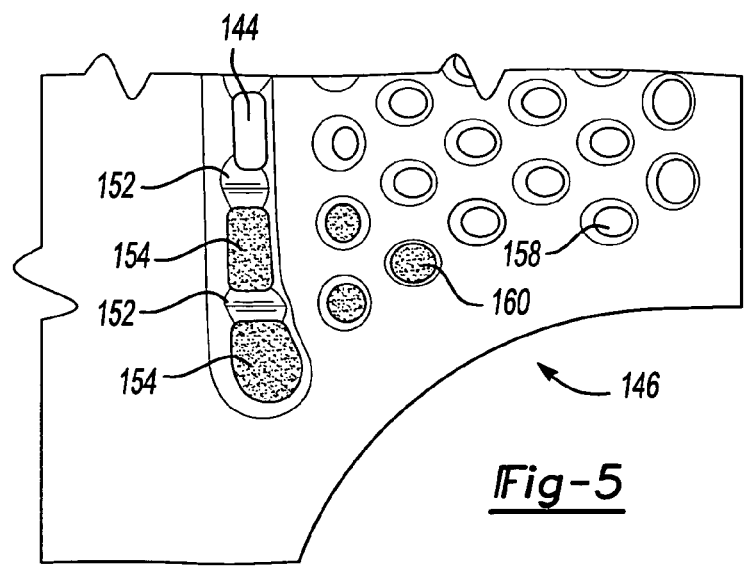
FIG. 5 shows a casting core for forming the inventive features shown in FIGS. 3 and 4.

FIG. 5 shows a modification which is made to a lost core 146 for forming the impingement rib 44 and pedestals 58 and 60. Holes 158 will form the solid pedestals 58 after the casting process is done. Separations 160 will form the space between the stubs 60, again after casting. Similarly, a hole 144 will form the solid portion of the impingement rib 44, while separating portions 154 will form the splits 54, and solid cross-over portions 152 form the holes 52. As is known, the passages within the turbine blades are typically formed by a cored, lost wax molding process. A worker of ordinary skill in the art would recognize that the solid portions shown in FIG. 5 will result in hollow spaces in the final formed turbine, whereas hollow spaces in the core 146 shown in FIG. 5 will result in solid metal.

While the invention is disclosed with an impingement rib associated with a pedestal array, impingement ribs are also known to separate a cooling channel from a hollow chamber without that pedestal array. The present invention would provide benefits in such a structure also.

While the invention has been disclosed in a turbine blade, it may have application in other components that have an airfoil shape, such as vanes.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A component for a gas turbine engine comprising:
   a platform, and an airfoil extending from said platform, said airfoil being generally hollow between two spaced walls and including a plurality of cooling channels, said airfoil extending from a leading edge toward a trailing edge; and
   an impingement rib separating one of said cooling channels from a chamber at a trailing edge of the airfoil, air being supplied into said one cooling channel and through cross-over holes in said impingement rib into said chamber, and said impingement rib having a split at a lower portion adjacent said platform, and said impingement rib having at least a paddle extending inwardly from at least one of said spaced walls of said airfoil, with said split being aligned with said at least one paddle.

2. The gas turbine engine component as set forth in claim 1, wherein a pedestal array is disposed in said chamber.

3. The gas turbine engine component as set forth in claim 2, wherein said impingement rib includes a pair of said paddles on said spaced walls of said airfoil, with said split formed between said paddles.

4. The gas turbine engine component as set forth in claim 3, wherein said split extends upwardly for at least two cross-over holes.

5. The gas turbine engine component as set forth in claim 2, wherein said pedestal array includes a plurality of pedestals, with at least some of said pedestals extending across a width of said component, and between said spaced walls.

6. The gas turbine engine component as set forth in claim 5, wherein at least one of said pedestals is formed of pedestal stubs which do not extend across said width.

7. The gas turbine engine component as set forth in claim 6, wherein said pedestal stubs are formed within said pedestal array adjacent said platform, and said lower portion of said impingement rib.

8. The gas turbine engine component as set forth in claim 7, wherein said pedestal stubs are formed at a location closest to said lower portion of said impingement rib and said platform.

9. The gas turbine engine component as set forth in claim 8, wherein there are at least a plurality of said pedestal stubs.

10. The gas turbine engine component as set forth in claim 1, wherein said component is a turbine blade.

11. The gas turbine engine component as set forth in claim 1, wherein said at least one paddle includes a pair of paddles on said spaced walls of said airfoil, with said split formed between said paddles.

12. A gas turbine engine comprising:
    a fan section, a compressor section, a combustion section and a turbine section;
    said turbine section including at least one component having an airfoil extending from a platform, and said component including a platform, and an airfoil extending from said platform, said airfoil being generally hollow between two spaced walls and including a plurality of cooling channels, said airfoil extending from a leading edge toward a trailing edge, and a pedestal array formed within said generally hollow airfoil adjacent said trailing edge, and an impingement rib separating one of said cooling channels from said pedestal array, air being supplied into said one cooling channel and through cross-over holes in said impingement rib into said pedestal array, and said impingement rib having a split at a lower portion adjacent said platform; and
    said impingement rib including a pair of paddles on said spaced walls of said airfoil, with said split formed between said paddles.

13. The gas turbine engine as set forth in claim 12, wherein said split extends upwardly for at least two cross-over holes.

14. The gas turbine engine as set forth in claim 12, wherein said pedestal array includes a plurality of pedestals, with at least some of said pedestals extending across a width of said component, and between said spaced walls.

15. The gas turbine engine as set forth in claim 14, wherein at least one of said pedestals is formed of pedestal stubs which do not extend across said width.

16. The gas turbine engine as set forth in claim 15, wherein said pedestal stubs are formed within said pedestal array adjacent said platform, and said lower portion of said impingement rib.

17. The gas turbine engine as set forth in claim 16, wherein said pedestal stubs are formed at a location closest to said lower portion of said impingement rib and said platform.

18. The gas turbine engine as set forth in claim 17, wherein there are at least a plurality of said pedestal stubs.

19. The gas turbine engine as set forth in claim 12, wherein said component is a turbine blade.

20. A turbine blade for a gas turbine engine comprising:
    a platform, and an airfoil extending from said platform, said airfoil being generally hollow between two spaced walls and including a plurality of cooling channels, said airfoil extending from a leading edge toward a trailing edge;
    a pedestal array formed within said generally hollow airfoil adjacent said trailing edge, and an impingement rib separating one of said cooling channels from said pedestal array, air being supplied into said one cooling channel and through cross-over holes in said impingement rib into said pedestal array, and said impingement rib having a split at a lower portion adjacent said platform, said impingement rib includes a pair of paddles on spaced sides of said airfoil, with said split formed between said paddles, said split extends upwardly for at least two cross-over holes; and said pedestal array includes a plurality of pedestals, with at least some of said pedestals extending across a width of said component, and between said spaced walls, and at least one of said pedestals is formed of pedestal stubs which do not extend across said space, said pedestal stubs are formed within said pedestal array adjacent said platform, and said lower portion of said impingement rib, said pedestal stubs are formed at a location closest to said lower portion of said impingement rib and said platform.

* * * * *